United States Patent [19]
Martin et al.

[11] 4,111,614
[45] Sep. 5, 1978

[54] MAGNETICALLY COUPLED GEAR PUMP CONSTRUCTION

[75] Inventors: Thomas B. Martin, Pleasant Hill; Ferdinandus A. Pieters, Walnut Creek, both of Calif.

[73] Assignee: Micropump Corporation, Concord, Calif.

[21] Appl. No.: 761,867

[22] Filed: Jan. 24, 1977

[51] Int. Cl.² .......................... F04B 35/04; F04B 9/00
[52] U.S. Cl. .................................. 417/420; 403/359; 418/206
[58] Field of Search ............... 417/410, 420; 418/206; 403/359

[56] References Cited

U.S. PATENT DOCUMENTS

| | | | |
|---|---|---|---|
| 1,771,349 | 7/1920 | Puffer | 403/359 |
| 2,382,539 | 8/1945 | Brady, Jr. | 417/410 |
| 2,825,286 | 3/1958 | White | 417/410 |
| 2,846,951 | 8/1958 | Metral et al. | 417/410 |
| 3,205,827 | 9/1965 | Zimmermann | 417/420 |
| 3,411,450 | 11/1968 | Clifton | 417/420 |
| 3,716,306 | 2/1973 | Martin et al. | 417/420 |
| 3,802,804 | 4/1974 | Zimmerman | 417/420 |
| 3,881,849 | 5/1975 | Commarmot | 418/206 |
| 4,013,384 | 3/1977 | Oikawa | 417/420 |

*Primary Examiner*—C. J. Husar
*Attorney, Agent, or Firm*—Julian Caplan

[57] ABSTRACT

A pump body has a cavity containing gears and parts communicating between the exterior and the cavity as well as two shafts on which the gears revolve. One face of the cavity is closed off by an apertured plate. The drive gear shaft extends through the aperture in the plate and supports the driven magnet. Drive means also extend through the aperture causing the hub of the driven magnet to turn the drive gear. All parts to the motor side of the plate may be standardized, while the pump body and its contents may be specially adapted to the particular ultimate installation of the pump.

6 Claims, 7 Drawing Figures

MAGNETICALLY COUPLED GEAR PUMP CONSTRUCTION

This invention relates to a magnetically coupled gear pump construction consisting of three parts, two of which may be highly standardized and the third may be specially adapted to the ultimate installation of the pump. The first of the parts is the motor and the drive magnet and its support. The second part is the driven magnet and the separator cup which separates the two magnets. The third part is the pump body which is formed with a cavity containing the drive and driven gears as well as ports communicating from the exterior of the body to the cavity and shafts or pins on which the gears rotate. Closing off one side of the pump cavity is a plate formed with an aperture. All of the parts on the side of the plate opposite the motor may be specially adapted to the particular installation of the pump.

A particular feature and advantage of the invention is that it has only one major part containing all of the pump details including an interface with the particular user's installation such as threaded fittings, seals, and special mechanical or hydraulic provisions. This part which is denominated herein the pump body and, if required, the gears can be changed to suit a particular ultimate use of the pump. All the other parts remain unchanged, these parts including the drive details and the pump enclosure.

Accordingly, the present invention provides a pump which is capable of mass production techniques. Among these techniques are the use of punch press parts, plastic molding, standard hardware items and a variety of materials of construction without major design changes.

Another feature of the invention is the fact that it has relatively few parts and a minimum of close tolerance dimensions. This feature reduces manufacturing costs and also permits assembly without the added expense of close fits.

Heretofore, magnetically coupled centrifugal pumps have been manufactured by many sources in a variety of forms because of the fact that their relative simplicity and lack of close-fitting clearances in order to obtain acceptable pump performance makes fabrication relatively easy. On the other hand, building magnetically coupled gear pumps has required strict technical discipline in order to obtain acceptable performance. The present invention enables wider use of magnetically coupled gear pumps because of the reduction in the cost of fabrication of such pumps by practice of the present invention.

Other objects of the present invention will become apparent upon reading the following specification and referring to the accompanying drawings in which similar characters of reference represent corresponding parts in each of the several views.

Figure 1:
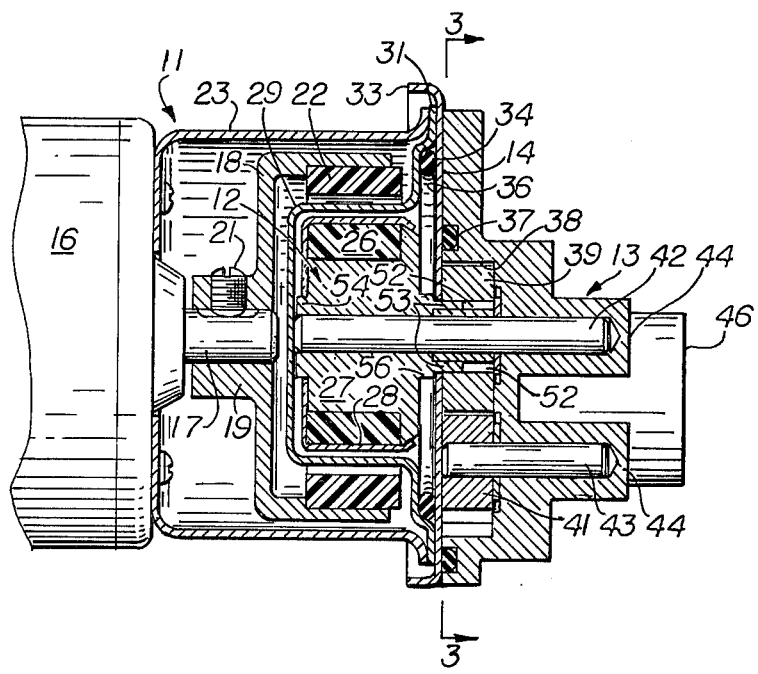
FIG. 1 is a vertical midsectional view through one form of pump in accordance with the present invention, the motor being broken away to conserve space.
Figure 2:
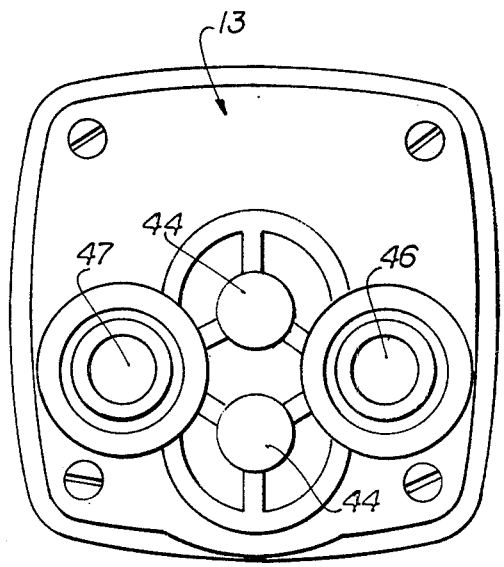
FIG. 2 is an end elevation from the right of FIG. 1.
Figure 3:
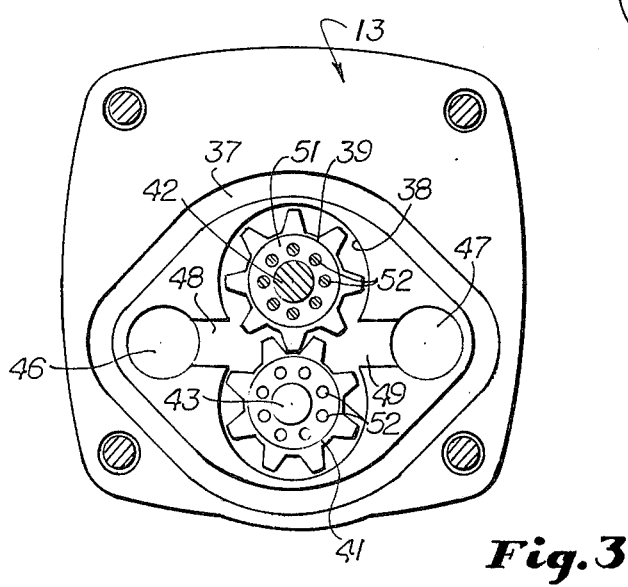
FIG. 3 is a sectional view taken substantially along the line 3—3 of FIG. 1.

Directing attention first to the modification of FIGS. 1-3, a pump in accordance with the present invention consists of a drive magnet portion 11 containing the motor drive, a driven magnet portion 12, a pump body 13, and an apertured plate 14 separating the pump body from the driven magnet portion. These parts will be described in detail.

Drive magnet portion 11 has an electric motor 16 shown partially in FIG. 1 having a shaft 17. Drive magnet mounting member 18 is generally cup shaped and has a hub 19 at one end attached to shaft 17 as by means of set screw 21. On the inside of cup member 18 is the annular drive magnet 22. A magnet enclosure 23 may be attached to the shaft end of motor 16 extending outwardly and surrounding the member 18.

Driven magnet portion 12 contains an annular driven magnet 26 of smaller diameter than magnet 12 mounted on driven magnet hub 27 and held thereon by means of retainer 28. A non-magnetic material separator cup 29 is interposed between the magnets 22 and 26 and has a flange 31 which is attached to the outer end of enclosure 23. Cup 29 permits the magnet 22 to drive the magnet 26 but is a barrier to fluid communication therebetween.

Plate 14, in the form of the invention as best shown in FIG. 1, has a peripheral flange 33 which rigidifies its construction. Seal 34 provides a seal between cup flange 31 and plate 14.

Pump body 13 is specially designed for the particular installation of the pump. Essentially it consists of a member having a flat face 36 against which plate 14 fits. A seal 37 recessed into a groove in face 36 surrounds and seals the pump cavity 38 which is recessed into face 36. Within cavity 38 are drive gear 39 and driven gear 41 which meshes therewith. Gear 39 rotates on stationary drive gear shaft or pin 42 while driven gear 41 rotates on stationary shaft 43. The shafts 42, 43 fit into appropriate holes in bosses 44 extending out the surface of body 13 opposite face 36. A ducted inlet port fitting 46 is formed on body 13 and on the opposite side of the body is ducted outlet for fitting 47. Fittings 46, 47 are located in such a position and are threaded or otherwise provided with coupling means to accommodate the requirements of the user of the pump and hence are subject to wide variation. One of the features of the invention is the fact that the member 13 may be specially designed to accommodate the end use while the members 11, 12 and 14 are standardized. Further, the depth of cavity 38 and the length of gears 39, 41 is subject to variation as are the materials of construction of said gears.

A particular feature of the present invention is the fact that gear 39 has a hub 51 formed with a plurality of holes 52 spaced around a circular pattern. For economy of production, the gear 41 may be similarly formed on the holes 52 may be eliminated in gear 41. Hub 27 of member 12 is formed with protrusions 53 which extend through the aperture in plate 14 and fit into some or all of the holes 52. These protrusions 53 surround the shaft 42 which preferably mounts not only gear 39 but also hub 27, the shaft 42 being considerably longer than the shaft 43. In order to eliminate undesirable wear and to center the hub 27, annular extensions 54 and 56 project in opposite directions from hub 27 toward cup 29 and plate 14, respectively.

It will thus be seen that motor 16 drives the magnet 22 which is magnetically coupled to the magnet 26 and turns the same, preferably freely turning the hub 27 on stationary shaft 42. The protrusions 53, fitting into the holes 52 in hub 51 of the drive gear 39, turn the latter as the motor 16 turns. The teeth of gear 39 mesh with the teeth of gear 41, which revolves upon the stationary shaft 43. As the gears turn, they pump fluid from the inlet port 48 to the outlet port 49 in a manner well understood in the pump gear art. To balance the pressure between that in the pump cavity 38 and that on the opposite side of plate 14, the protrusions 53 may be dimensioned to fit fairly loosely within the holes 52 or the number of holes 52 may exceed the number of protrusions 53.

It will readily appear that all of the elements including plate 14 and the portions 11 and 12 on the motor side thereof may be standardized and mass produced to accommodate a wide variety of designs of pump bodies 13. The pump body 13 may be specially designed to fit any user's installation, all as heretofore explained.

Figure 4:
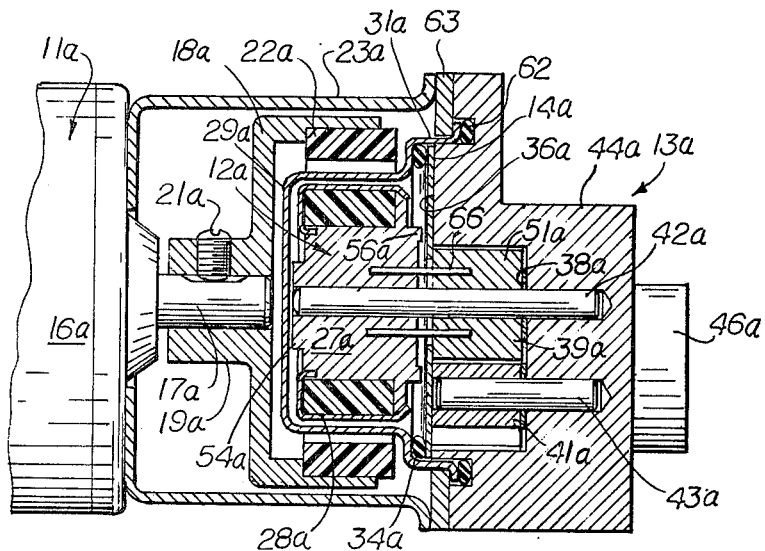
FIG. 4 is a view similar to FIG. 1 of a modified construction.
Figure 5:
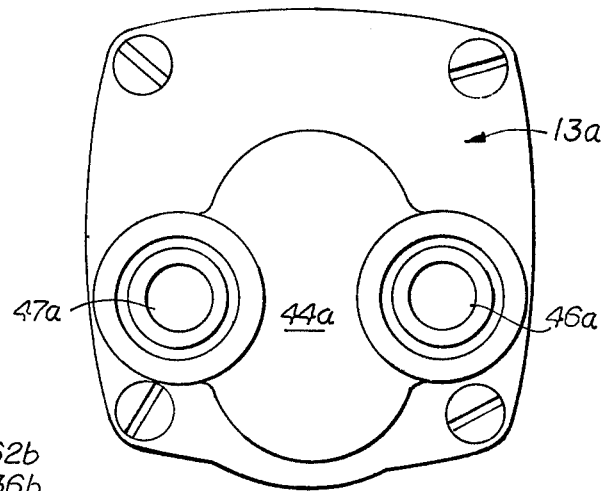
FIG. 5 is an end elevational view of the structure of FIG. 4.

The construction of the modifications of FIGS. 4 and 5 resembles in many respects that of FIGS. 1-3. One of the differences is the fact that the plate 14a is smaller in outside diameter than that of the preceding modification and the cup flange 31a extends into a groove in the pump body 13a where it is sealed by means of seal ring 62. The pump body 13a is formed with a protrusion 61 fitting inside the flange 31a. Flange 31a is held in place by a ring 53 which surrounds flange 31a and the ring 63 is secured to the body 13a by retainers 64 or other means.

Another respect in which the modification of FIGS. 4 and 5 differs from that of FIGS. 1-3 is the fact that hub 27a is connected to the hub 51a of gear 38a by means of a series of pins 66 spaced about the circular pattern surrounding shaft 42a. The ends of the pins 66 are received in the holes in the opposed faces of hubs 27a and 51a. To insure that the pressure within the cavity 38a is equalized with that on the magnet side of plate 14a, the number of holes may exceed the number of pins 66.

Figure 7:
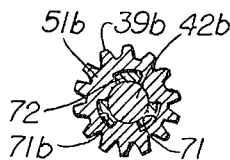
FIG. 7 is a fragmentary sectional view taken substantially along the line 7—7 of FIG. 6.
Figure 6:
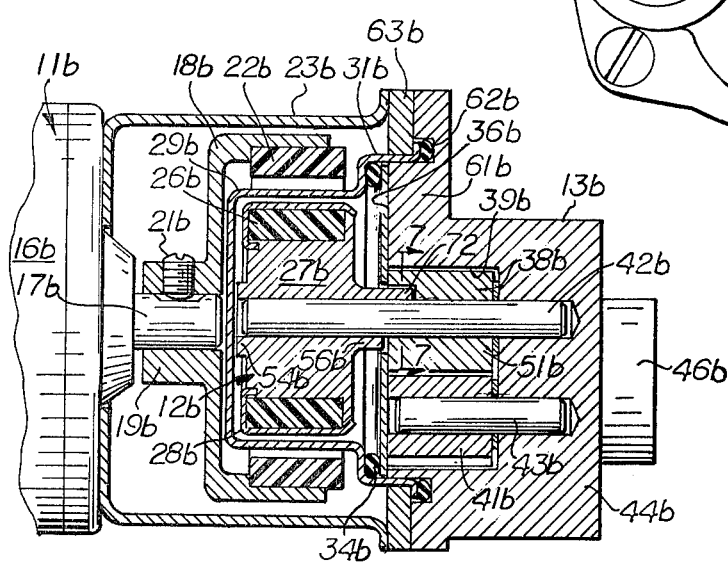
FIG. 6 is a view similar to FIG. 1 of still another modified construction.

The modification of FIGS. 6 and 7 resembles that of FIGS. 4 and 5 in many respects. It will be seen, however, that the bore in hub 38b is formed with shallow spline-like recesses 71. These are shown as three in number in FIG. 7, although the number is subject to variation. To mate with the recesses 71, projections 72 on the annular extension 56b of hub 27b of driven magnet portion 12b are formed with a relatively loose fit in splines 71b.

In many respects, the modification of FIGS. 4 and 5 and 6 and 7 resemble those of the modification of FIGS. 1-3, and the same reference numerals followed by the subscripts *a* and *b*, respectively, are used to designate corresponding parts.

What is claimed is:

1. A magnetically coupled gear pump comprising an annular drive magnet, a prime mover for rotating said drive magnet, an annular driven magnet, driven magnet mounting means holding said driven magnet in proximity to said drive magnet, a non-magnetic separator cup interposed between said magnets, said cup having a peripheral flange, a pump body formed with a face with a gear cavity recessed into said face, drive and driven gears in said cavity, said body formed with inlet and outlet ports leading from the exterior of said pump body to said cavity on opposite sides of said gears, first and second shafts supported parallel to each other by said body and extending into said cavity and supporting said drive and driven gears for rotation on said shafts, respectively, said first shaft extending beyond said body and also rotatably supporting said driven magnet mounting means, a plate formed with an aperture and supported across said face of said body, said plate being sealed to said body and to said peripheral flange of said separator cup, said plate substantially closing off said cavity and also closing off said separator, said first shaft extending through said aperture and cooperating means on said driven magnet mounting means and said drive gear whereby, as said drive magnet causes rotation of said driven magnet, said driven magnet rotates said drive gear.

2. A pump according to claim 1 in which said pump body and said plate are detachable from said driven magnet mounting means and said separator cup, said pump body being replaceable with another pump body of different shape or materials and with drive and driven gears of different shapes and materials.

3. A pump according to claim 1 in which said drive gear is formed with a ring of small holes surrounding said first shaft and said driven magnet mounting has a hub formed with protrusions extending through said aperture into said small holes, said protrusions and said small holes comprising said cooperating means.

4. A pump according to claim 1 in which said drive gear is formed with a first ring of first small holes surrounding said first shaft and said driven magnet mounting has a hub formed with an opposed second ring of second small holes, said cooperating means comprising a plurality of pins fitting into said first and second holes.

5. A pump according to claim 1 in which said cooperating means comprises a hub in which said first shaft is received formed with at least one axially extending projection fitting through said aperture, said drive gear being formed with a shallow, spline-like recess to receive said projection.

6. A pump according to claim 1 in which the fit of said cooperating means is loose enough so that fluid in said pump cavity communicates with the interior of said separator to balance the fluid pressure on opposite sides of said plate.

* * * * *